US011582355B2

(12) United States Patent
Ito

(10) Patent No.: US 11,582,355 B2
(45) Date of Patent: Feb. 14, 2023

(54) INFORMATION PROCESSING METHOD, INFORMATION PROCESSING APPARATUS, AND STORAGE MEDIUM

(71) Applicant: CANON KABUSHIKI KAISHA, Tokyo (JP)

(72) Inventor: Koji Ito, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 16/898,273

(22) Filed: Jun. 10, 2020

(65) Prior Publication Data

US 2020/0396345 A1 Dec. 17, 2020

(30) Foreign Application Priority Data

Jun. 13, 2019 (JP) .............................. JP2019-110637

(51) Int. Cl.
*H04N 1/00* (2006.01)

(52) U.S. Cl.
CPC ..... *H04N 1/00214* (2013.01); *H04N 1/00244* (2013.01); *H04N 1/00307* (2013.01); *H04N 1/00424* (2013.01)

(58) Field of Classification Search
CPC ........... H04N 1/00214; H04N 1/00244; H04N 1/00307; H04N 1/00424
USPC ....................................................... 358/1.15
See application file for complete search history.

(56) References Cited

U.S. PATENT DOCUMENTS

| | | | | |
|---|---|---|---|---|
| 8,854,669 | B1* | 10/2014 | Jazayeri | G06F 3/1288 358/1.15 |
| 8,990,672 | B1* | 3/2015 | Grosz | G06F 40/106 715/202 |
| 10,620,894 | B2* | 4/2020 | B T | G06F 3/1285 |
| 2016/0094785 | A1* | 3/2016 | Muro | G06F 16/58 348/231.3 |
| 2016/0139761 | A1* | 5/2016 | Grosz | G06F 3/0482 715/769 |
| 2017/0156024 | A1* | 6/2017 | Shigaki | H04L 67/36 |
| 2017/0346851 | A1* | 11/2017 | Drake | H04L 63/0428 |
| 2018/0181281 | A1* | 6/2018 | Suki | G09B 29/10 |
| 2019/0109846 | A1* | 4/2019 | Shieh | H04L 63/0861 |
| 2019/0295132 | A1* | 9/2019 | Anjo | G06F 40/186 |

FOREIGN PATENT DOCUMENTS

| | | | | |
|---|---|---|---|---|
| EP | 3232317 | * | 10/2017 | ............. G06F 3/12 |
| IN | 201641024019 | * | 1/2018 | .......... G06F 3/1285 |
| JP | 2014048720 A | | 3/2014 | |

* cited by examiner

*Primary Examiner* — Jerome Grant, II
(74) *Attorney, Agent, or Firm* — Canon U.S.A., Inc. IP Division

(57) ABSTRACT

Data corresponding to an image selected by a user is transmitted to a printing apparatus by a program being executed, and it is determined whether printing based on the data has been completed by the printing apparatus. Then, an input screen for the user to input a rating of the program is displayed on a display used by an information processing apparatus on a condition that the printing has been determined as having been completed.

15 Claims, 12 Drawing Sheets

FIG.6

- 600
- 601 PRINT
- PRINT SETTING
- 602
- NUMBER OF PRINTS: 1
- 603
- EDIT IMAGE — 604  1/1
- PRINTER
  PRINTER MODEL-X (192.168.Y.Z) — 605
- CHANGE SETTING — 606
- SETTING OF NUMBER OF PRINTS
  SET INDIVIDUALLY
- PRINTING OF DATE
  OFF
- AUTOMATIC IMAGE CORRECTION
  ON
- RED-EYE CORRECTION
  OFF
- 607
- TOTAL NUMBER OF PRINTS: 1

FIG.8

800 — < DETAILED PRINT SETTING

801 — SETTING OF NUMBER OF PRINTS
SET INDIVIDUALLY >

PRINTING OF DATE
OFF >

AUTOMATIC IMAGE CORRECTION
ON >

RED-EYE CORRECTION
OFF >

SHEET SIZE
3.5 x 5 in >

TYPE OF SHEET
GLOSSY PHOTO PAPER >

FEEDING METHOD
AUTOMATIC SELECTION >

PRINT QUALITY
AUTOMATIC >

BORDER SETTING
BORDERLESS >

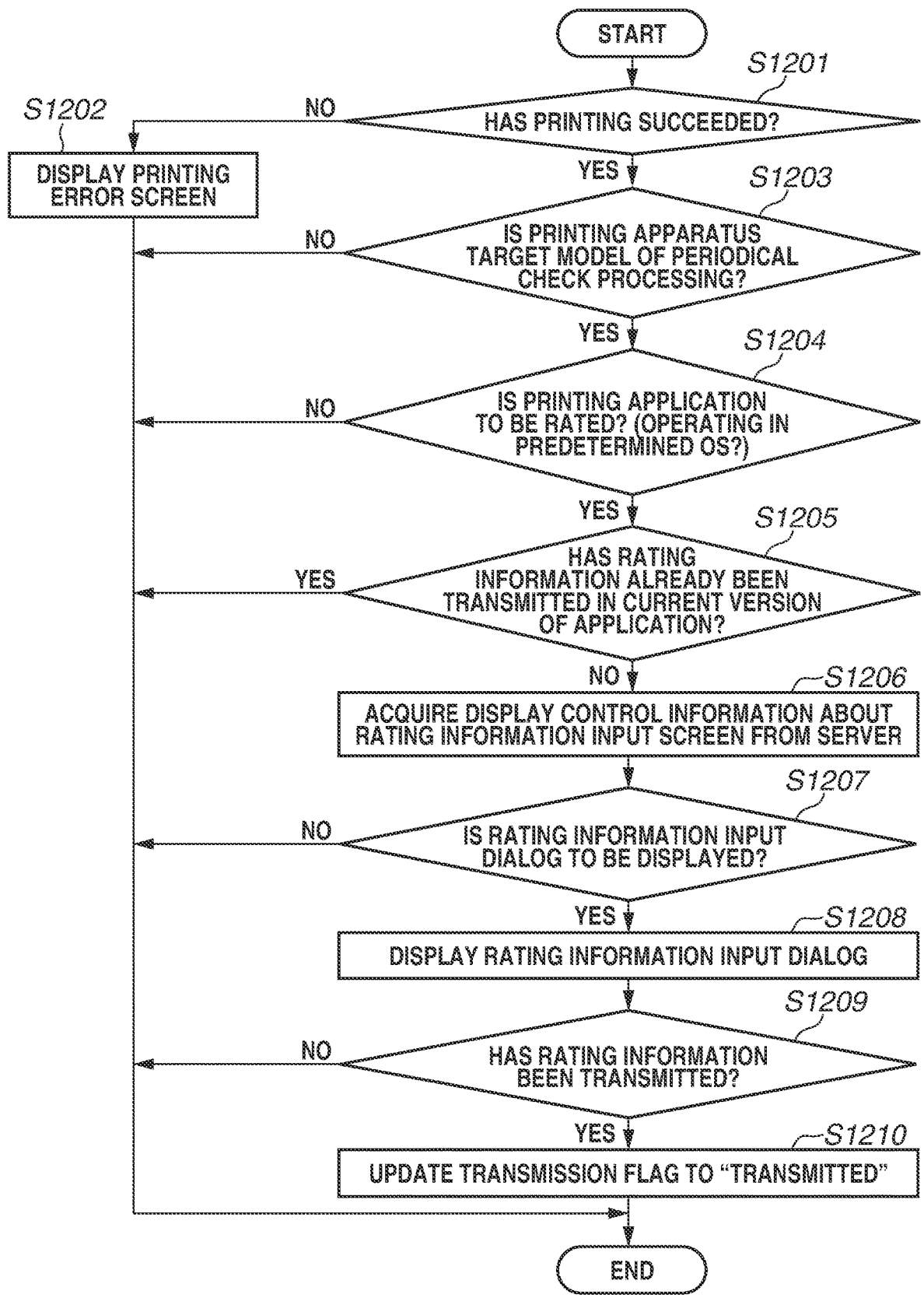

INFORMATION PROCESSING METHOD, INFORMATION PROCESSING APPARATUS, AND STORAGE MEDIUM

This Application claims the benefit of PCT/US2017/060216 having an International Filing Date of Nov. 6, 2017, which claims priority from U.S. Provisional Application Ser. No. 62/418,122 filed Nov. 4, 2016.

BACKGROUND

Field

The present disclosure relates to a storage medium storing a program, an information processing apparatus, and an information processing method for causing a printing apparatus to perform printing.

Description of the Related Art

A smartphone equipped with an operating system (OS) sometimes downloads an application via the Internet from a store site managed by a development vender of the OS.

On such a store site, a rating of an application based on the number of stars and comments such as feedback are displayed to be an index for a user to decide whether to download the application. Japanese Patent Application Laid-Open No. 2014-48720 discusses a technique for rating an application.

For a purpose of such rating of an application, the application sometimes displays a screen for the user to give a rating. The rating input on the screen is reflected on a store site. Accordingly, the appropriate rating from the user using the application can be reflected on the store site.

SUMMARY

For the user to appropriately give a rating, it is considered necessary that processing related to the application has been completed before the rating. For example, consider a case where, in an application that issues a printing instruction to a printer, the above-described screen for the user to give a rating is displayed before printing has been completed. In such a case, while the application is an application that issues a printing instruction, the user is asked to input a rating of the application in a state where the printing has not been completed. Thus, the user may feel that the user cannot give an appropriate rating.

In view of the foregoing, the present disclosure features a technique that can display an input screen for a user to input a rating of a program based on an appropriate condition.

According to an aspect of the present disclosure, an information processing method, to be executed by an information processing apparatus, that supports a printing apparatus in performing printing using at least one processor to execute a program includes selecting a print target image from among a plurality of images based on an instruction issued by a user, executing processing in which the information processing apparatus transmits data corresponding to the selected image to the printing apparatus, determining whether printing performed by the printing apparatus based on the data transmitted in the processing has been completed, and displaying, on a display used by the information processing apparatus, an input screen for the user to input a rating of the program on a condition that the printing has been determined as having been completed.

Further features of the present disclosure will become apparent from the following description of exemplary embodiments with reference to the attached drawings.

BRIEF DESCRIPTION OF THE DRAWINGS

FIG. 6 is a diagram illustrating a print setting confirmation screen.

FIG. 8 is a diagram illustrating a print setting screen.

FIG. 12 is a flowchart illustrating details of the rating processing according to the present exemplary embodiment.

DESCRIPTION OF THE EMBODIMENTS

Hereinafter, an exemplary embodiment of the present disclosure will be described in detail with reference to the attached drawings. The following exemplary embodiment does not limit the present disclosure set forth in the appended claims, and not all the combinations of features described in the present exemplary embodiment are always essential to a solution in accordance with the present disclosure.

In the following exemplary embodiment, the description will be given using a smartphone as an example of an information processing apparatus, but the type of the information processing apparatus is not limited to this as long as the information processing apparatus can handle a file to be printed. For example, various apparatuses such as a mobile terminal other than smartphones, a laptop personal computer (PC), a desktop PC, a tablet terminal, a personal digital assistant (PDA), and a digital camera can be used. As a printing apparatus, a printer such as an inkjet printer or a laser beam printer can be used. In addition, a multifunction peripheral having not only a print function but also a scan function, a copy function, and a facsimile function in which a document is read may be used.

<Configuration of Entire System>

Figure 1:
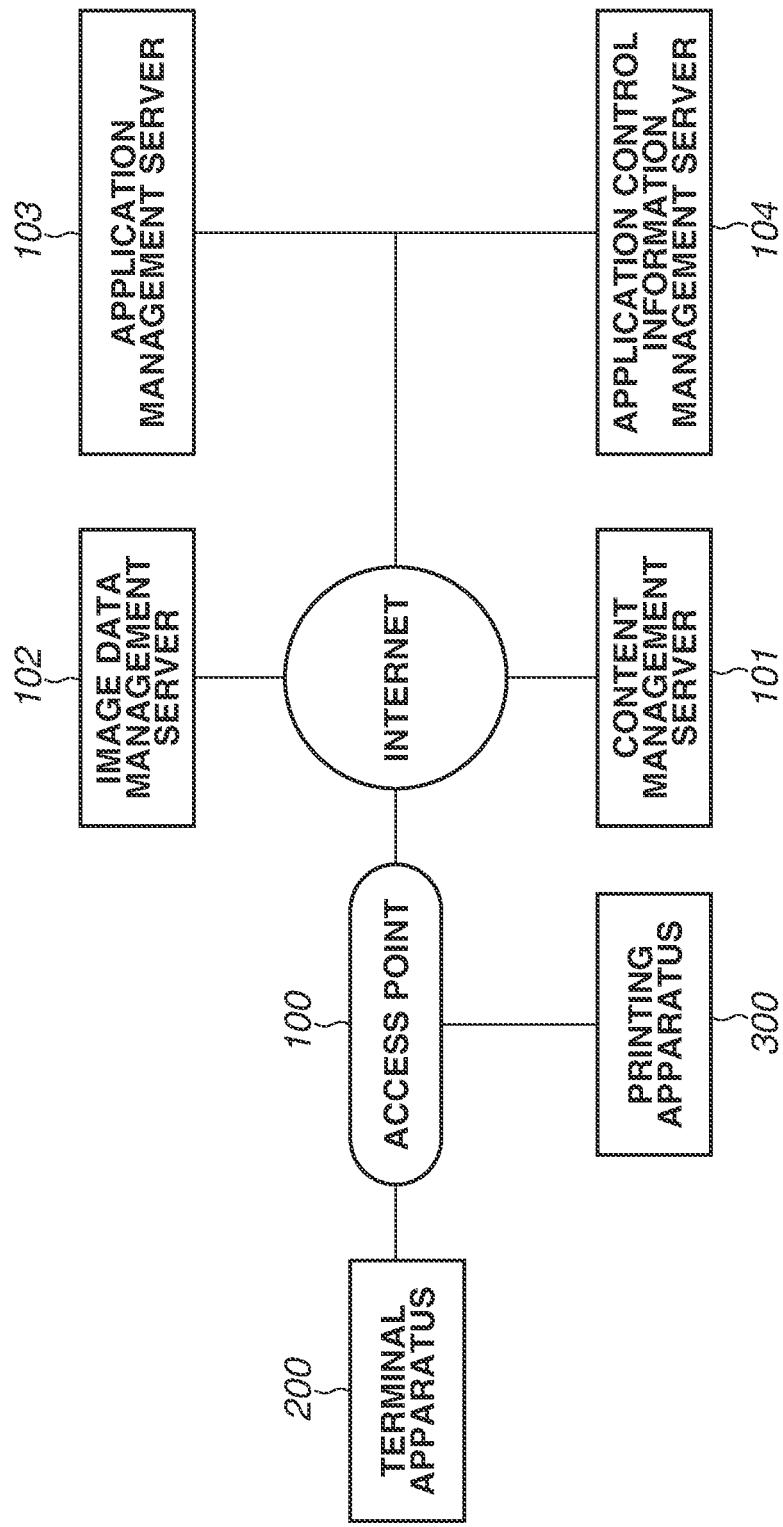
FIG. 1 is a block diagram illustrating a configuration of a print processing system.

FIG. 1 is a diagram illustrating a configuration of a print processing system. The print processing system includes a portable terminal apparatus 200 such as a smartphone, and a printing apparatus 300. The terminal apparatus 200 is an information processing apparatus that communicates with the printing apparatus 300 via a network constructed by an access point 100 and causes the printing apparatus 300 to execute printing. The terminal apparatus 200 stores a program such as a printing application to be described below. Accordingly, printing data created using the printing application is transmitted from the terminal apparatus 200 to the printing apparatus 300 via the network. Since the access point 100 according to the present exemplary embodiment functions as a wireless local area network (LAN) router, the terminal apparatus 200 is connected to the Internet via the wireless LAN router. Thus, the terminal apparatus 200 can communicate with a content management server 101 via the Internet. FIG. 1 illustrates only one printing apparatus 300, but a plurality of printing apparatuses 300 can connect to the access point 100.

The content management server 101 is an information processing apparatus that manages a template to be used by the printing application. An image data management server 102 is a server that can store image data of an image captured with a camera by the user. An application management server 103 is a server that manages a smartphone application. A rating of each application is also managed by the application management server 103. An application control information management server 104 stores control information about an application according to the present exemplary embodiment. The control information about the application includes information indicating whether to display a rating information input dialog to be described below.

<Configuration of Terminal Apparatus>

Figure 2:
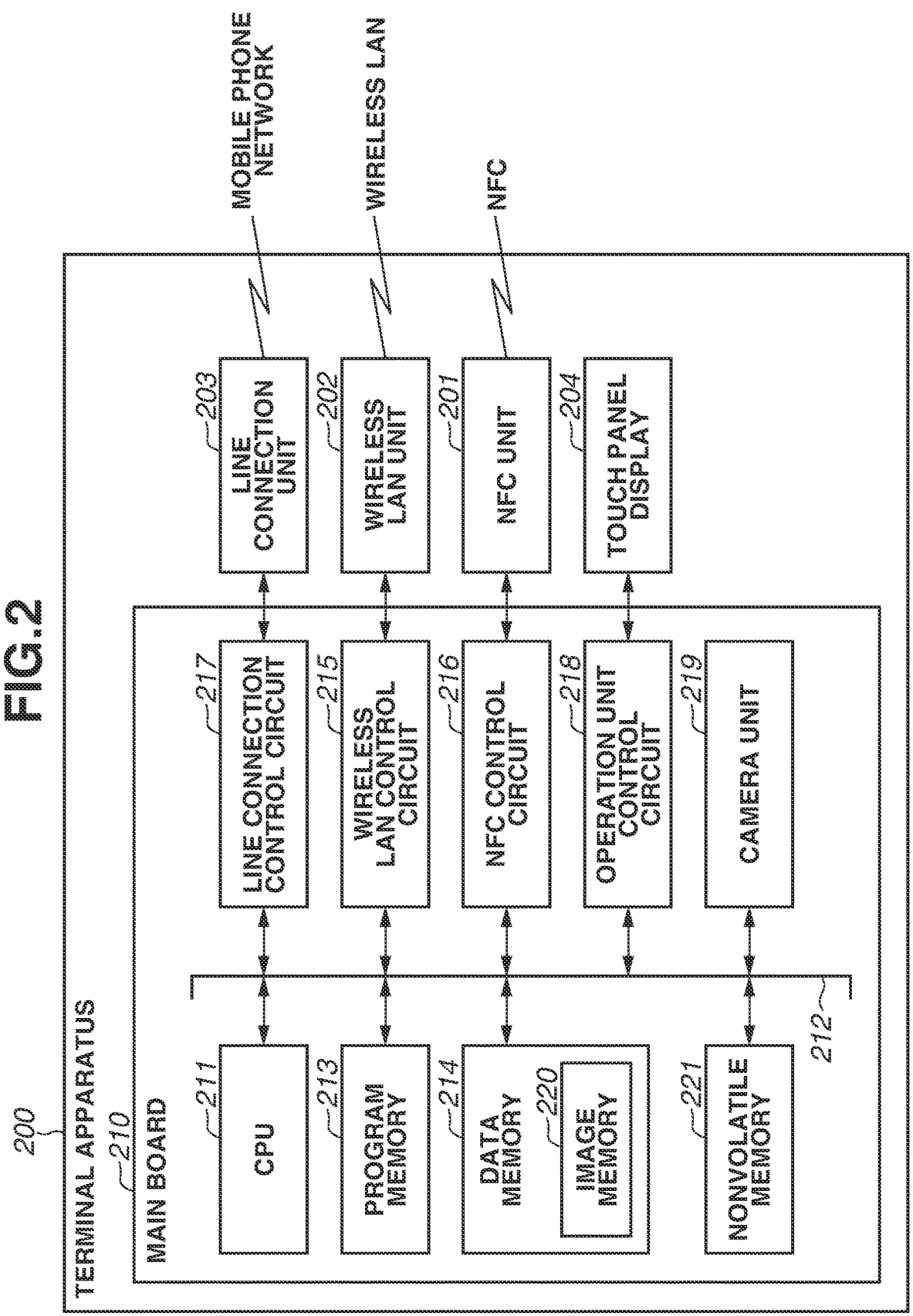
FIG. 2 is a block diagram illustrating a configuration of a terminal apparatus.

FIG. 2 is a block diagram illustrating a configuration of the terminal apparatus 200 used in the present system. The terminal apparatus 200 includes a main board 210 that controls the entire apparatus, a wireless LAN unit 202, a near field communication (NFC) unit 201, a line connection unit 203, and a touch panel display 204 that displays a functional operation of a printer and information regarding the printer. The NFC unit 201, the wireless LAN unit 202, and the line connection unit 203 can perform communication via NFC communication, a wireless LAN, and a mobile phone network, respectively.

A central processing unit (CPU) 211 having a microprocessor configuration is arranged in the main board 210, and operates based on a control program stored in a program memory 213 having a read-only memory (ROM) configuration and connected via an internal bus 212, and content stored in a data memory 214 having a random access memory (RAM) configuration and connected via the internal bus 212. The program memory 213 can store a built-in operating system (OS) and a program such as a printing application program according to the present exemplary embodiment. In the present exemplary embodiment, each application program stored in the program memory 213 is subjected to software execution control under the management of the OS. More specifically, an application program is implemented by the CPU 211 loading the application program stored in the program memory 213 into the data memory 214 having the RAM configuration, and executing the application program.

By controlling the wireless LAN unit 202 via a wireless LAN control circuit 215, the CPU 211 communicates with another communication terminal apparatus via a wireless LAN. The wireless LAN unit 202 can perform data (packet) communication using a communication method compliant with an IEEE 802.11 series standard (IEEE 802.11a, IEEE 802.11b, IEEE 802.11g. etc.), for example.

In addition, by controlling the NFC unit 201 via an NFC control circuit 216, the CPU 211 can detect NFC connection with another NFC terminal and perform data transmission and reception with the other NFC terminal. Furthermore, by controlling the line connection unit 203 via a line connection control circuit 217, the CPU 211 can connect to the mobile phone network to make a phone call and perform data transmission and reception. A unit for performing communication using a communication method of Bluetooth® Low Energy (BLE) may also be included.

By controlling an operation unit control circuit 218, the CPU 211 can perform display on the touch panel display 204 and can receive an operation from the user. The CPU 211 can capture an image by controlling a camera unit 219 and can store the captured image in an image memory 220 in the data memory 214. Aside from the captured image, the CPU 211 can also store an image acquired from the outside via the mobile phone network, the wireless LAN, or the NFC in the image memory 220, or transmit such an image to the outside.

A nonvolatile memory 221 includes a memory such as a flash memory, and stores data desired to be stored even after the power is turned off. For example, the nonvolatile memory 221 stores address book data, various types of communication connection information, device information regarding devices to which the terminal apparatus 200 has connected in the past, and image data desired to be stored. In a case of a nail sticker creation application according to the present exemplary embodiment, the nonvolatile memory 221 also stores application management information to be managed by the nail sticker creation application.

<Configuration of Printing Apparatus>

Figure 3:
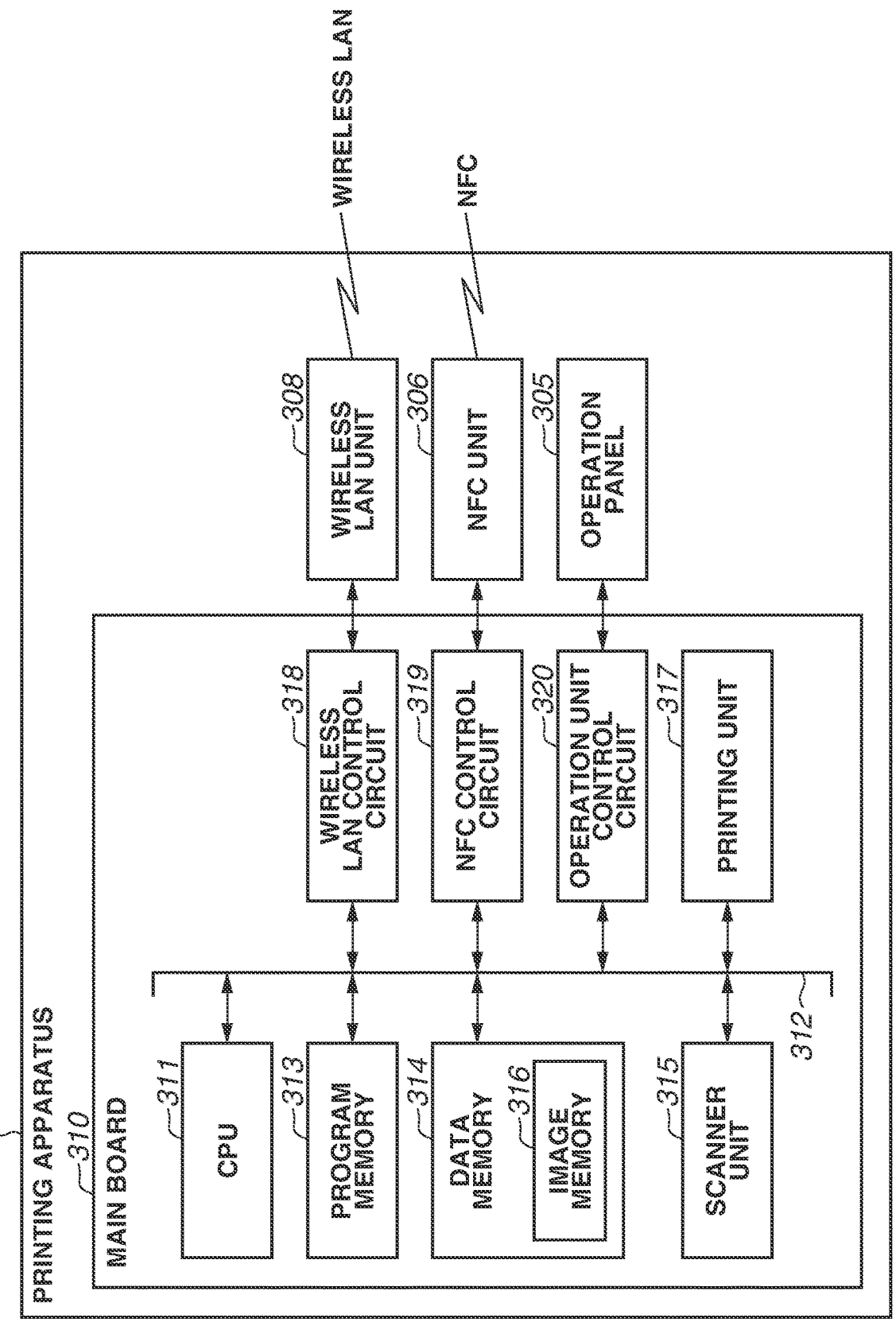
FIG. 3 is a block diagram illustrating a configuration of a printing apparatus.

FIG. 3 is a block diagram illustrating a configuration of the printing apparatus 300. The printing apparatus 300 includes a main board 310 that controls the entire apparatus, a wireless LAN unit 308, an NFC unit 306, and an operation panel 305. The wireless LAN unit 308 and the NFC unit 306 each function as a communication unit of the printing apparatus 300.

A CPU 311 having a microprocessor configuration is arranged in the main board 310, and operates based on a control program stored in a program memory 313 having a ROM configuration and connected via an internal bus 312, and content stored in a data memory 314 having a RAM configuration and connected via the internal bus 312.

By controlling a scanner unit 315, the CPU 311 reads a document and stores the read document into an image memory 316 in the data memory 314. In addition, by controlling a printing unit 317, the CPU 311 can print an image stored in the image memory 316 in the data memory 314 onto a recording medium. Scanned image data can be transmitted to a terminal apparatus via the wireless LAN unit 308 controlled by a wireless LAN control circuit 318.

By controlling the wireless LAN unit 308 via the wireless LAN control circuit 318, the CPU 311 communicates with another communication terminal apparatus via a wireless LAN. The wireless LAN unit 308 can perform data (packet) communication using a communication method compliant with an IEEE 802.11 series standard (IEEE 802.11a, IEEE 802.11b, IEEE 802.11g. etc.), for example. In addition, by controlling the NFC unit 306 via an NFC control circuit 319, the CPU 311 can detect NFC connection with another NFC terminal and perform data transmission and reception with the other NFC terminal.

By controlling an operation unit control circuit 320, the CPU 311 can display a state of the printing apparatus 300 and a function selection menu on the operation panel 305 and can receive an operation from the user.

The printing apparatus 300 according to the present exemplary embodiment can receive data in a JPEG file format to which a printer control command is added and can print the data.

<Configuration of Printing Application>

Next, a display screen of a printing application according to the present exemplary embodiment and an operation of the printing application will be described with reference to each of FIGS. 4 to 10. Display screens illustrated in FIGS. 4 to 10 are displayed on the touch panel display 204 by the CPU 211 executing the printing application stored in the program memory 213. The description will be given citing a case where a user interface control in the printing application according to the present exemplary embodiment is created in a cross-platform programming language such as HTML5 or JavaScript®. However, the programming language is not limited to these, and the user interface control may be created in a platform-dependent language such as Java) or Objective-C.

Figure 4:
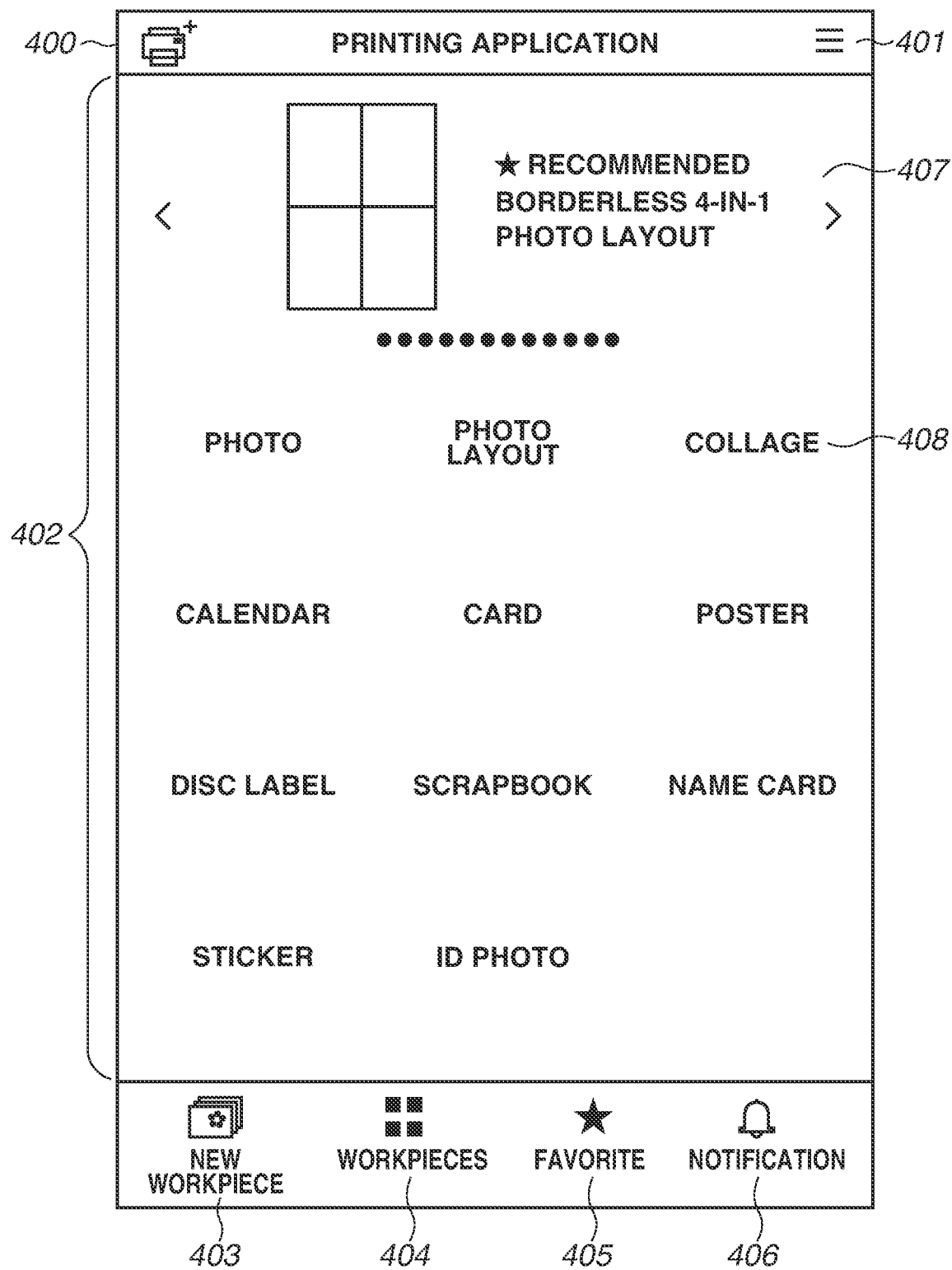
FIG. 4 is a diagram illustrating a top screen of a printing application.

FIG. 4 is a diagram illustrating a top screen of the printing application according to the present exemplary embodiment. On the screen illustrated in FIG. 4, a printer registration button 400, a menu button 401, a main display region 402, a new workpiece creation button 403, a workpiece display button 404, a favorite display button 405, and a notification display button 406 are displayed.

If any button of the buttons 403 to 406 is tapped, content corresponding to the tapped button is displayed in the main display region 402. FIG. 4 illustrates an example of the main display region 402 that is displayed when the printing application is activated or when the new workpiece creation button 403 is tapped.

If the printer registration button 400 is tapped, a printer registration screen (not illustrated) is displayed. Registration processing will be described below. If the menu button 401 is tapped, various types of information regarding the printing application, such as version information and licensing information, are displayed.

On the top screen illustrated in FIG. 4, a plurality of category selection buttons 408 is displayed in the main display region 402. Each of the category selection buttons 408 indicates a function for creating a workpiece printable by using the printing application according to the present exemplary embodiment. In FIG. 4, texts such as "Photo" and "Photo Layout" are displayed as the category selection buttons 408. Alternatively, icons may be displayed together with the texts. If any of the category selection buttons 408 is tapped, a screen to be displayed on the touch panel display 204 transitions to a screen for creating a workpiece to be printed by the function corresponding to the tapped category selection button 408. More specifically, if the category selection button 408 indicating "Photo" in FIG. 4 is tapped, a function "Photo" for printing image data in a JPEG or PNG file format on an entire surface of a print sheet can be used. If the category selection button 408 indicating "Photo Layout" in FIG. 4 is tapped, a function "Photo Layout Printing" for laying out a plurality of pieces of image data on a print sheet and printing the sheet can be used. In FIG. 4, the category selection buttons 408 indicating "Collage", "Calendar", "Card", "Poster", "Disc Label", "Scrapbook", "Name Card", "Sticker", and "ID Photo" are included. If any of the category selection buttons 408 is selected, a function of printing a workpiece created by inserting an image into a template can be used. The template may be supplied with the application or acquired from the content management server 101. An available template and the number of images to be inserted into the template vary depending on the category selection button 408 tapped by the user.

A pickup content display portion 407 illustrated in FIG. 4 is a display portion in which a conceptual image of a workpiece to be printed in a case where a template recommended for the user is used is displayed at random. In the example illustrated in FIG. 4, a conceptual image indicating a layout size and layout positions of photos is displayed. However, the conceptual image to be displayed in the pickup content display portion 407 is not limited to such an image. Alternatively, a conceptual image in which a sample photo is laid out may be displayed. For example, in the example illustrated in FIG. 4, a conceptual image in which four sample photos are arranged in four-way split layout regions is displayed.

If the workpiece display button 404 illustrated in FIG. 4 is tapped, a list of workpieces saved by the user is displayed in the main display region 402 as icons. The workpieces displayed in list form at this time are print target image data created by the user selecting any of the category selection buttons 408, and thumbnails of such image data are displayed in list form. In the displayed list, the thumbnails of workpieces may be displayed in a state where the workpieces are sorted by function corresponding to each of the category selection buttons 408.

If the favorite display button 405 is tapped, a list of templates registered by the user as favorite templates is displayed in the main display region 402. If the notification display button 406 is tapped, notification information about the application such as an update notice of a template is displayed in the main display region 402.

Next, an example to be displayed when the category selection button 408 is tapped will be described. If any of the category selection buttons 408 is tapped, the screen transitions to an image data selection screen. However, in the case of a function that uses a template, if the user issues an instruction for inserting an image into the template after the category selection button 408 is tapped, the image data selection screen is displayed. An example case where the category selection button 408 indicating "Photo" is tapped in FIG. 4 will be described.

Figure 5:
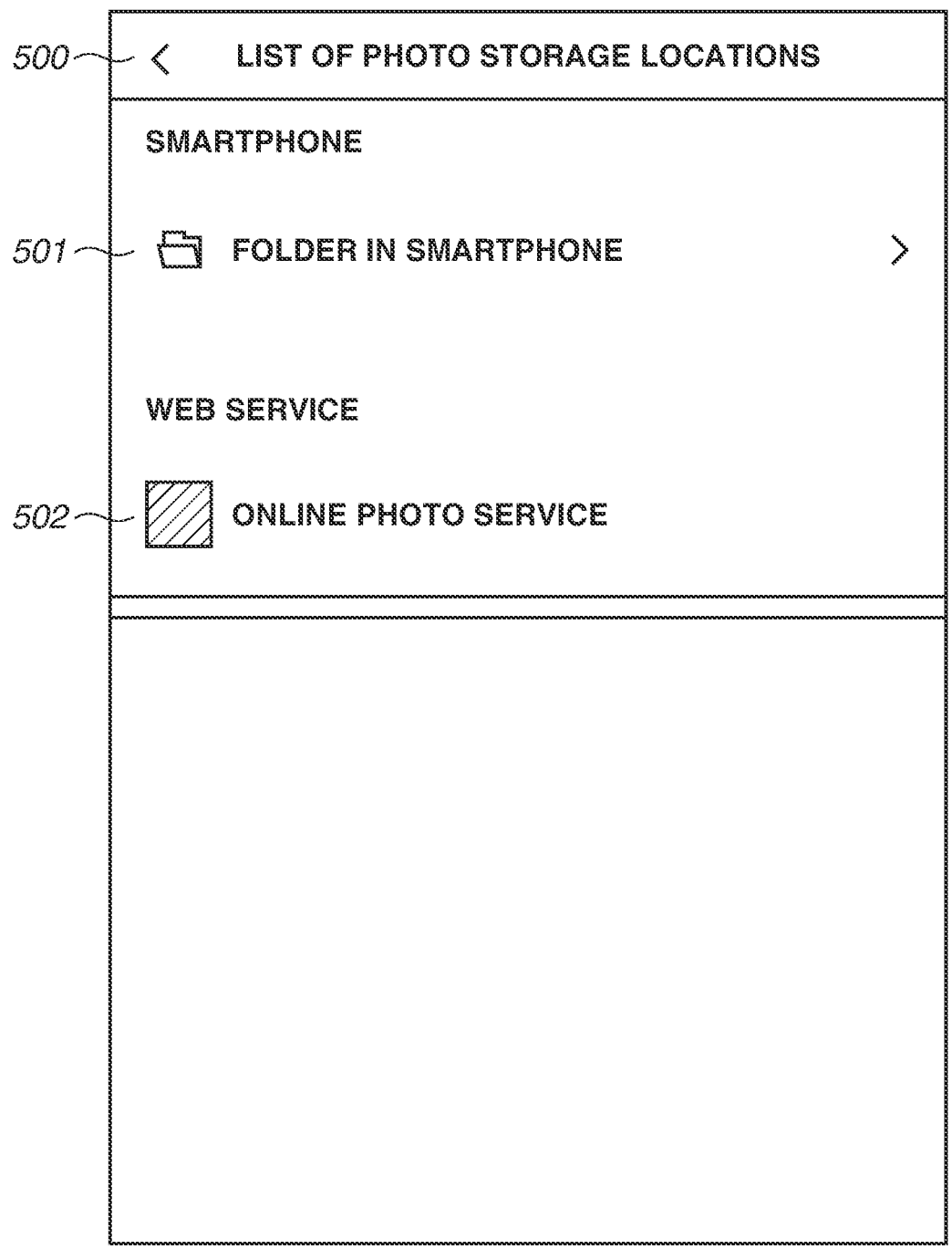
FIG. 5 is a diagram illustrating an image data selection screen.

FIG. 5 is a diagram illustrating the image data selection screen. The image data selection screen includes a return button 500, a local image selection button 501, and a cloud image selection button 502. If the return button 500 is tapped, a screen to be displayed on the touch panel display 204 transitions to a screen that is displayed before the screen transitions to the present screen. If the local image selection button 501 is tapped, a list of image data stored in the data memory 214 of the terminal apparatus 200 is displayed, and the user can select desired image data from the list as a print target. In the display region of the local image selection button 501, both an icon indicating a folder and a text indicating "Folder In Smartphone" are included. If the cloud image selection button 502 is tapped, image data of the user is acquired from the image data management server 102, and a list of the acquired image data is displayed. Then, the user can select a desired image from the list of the image data as a print target. In the display region of the cloud image selection button 502, both an icon and a text indicating "Online Photo Service" are included. In addition, a plurality of cloud image selection buttons 502 corresponding to a plurality of online photo services (online photo storages) may be displayed. In such a case, an icon corresponding to each of the online photo services is displayed. In addition, if the cloud image selection button 502 is tapped, a login screen for logging into the online photo service may be displayed. On the login screen, the user enters a user account and a password, and if the user is successfully authenticated by the image data management server 102 based on the pieces of entered information, image data managed in association with the user account is displayed in list form.

FIG. 6 is a diagram illustrating a print setting confirmation screen to be displayed after the user selects a print target image on the screen illustrated in FIG. 5. The print setting confirmation screen includes a return button 600, a printing start button 601, a preview display portion 602, a number of prints setting button 603, a workpiece edit button 604, registered printer information 605, a print setting button 606, and a print setting display portion 607. If the return button 600 is tapped, a screen to be displayed transitions to a screen that is displayed before the screen illustrated in FIG. 6. If the printing start button 601 is tapped, a printing job is transmitted to the printing apparatus 300 based on a set print setting, and a print processing in progress screen to be described below is displayed. If the workpiece edit button 604 is tapped, a workpiece edit screen to be described below is displayed. In the preview display portion 602, a print preview based on a print target image selected by the user on the screen illustrated in FIG. 5 is displayed. As the print preview, a thumbnail of the print target image selected by the user may be displayed without being trimmed. Alternatively, the print target image trimmed based on a sheet size setting and a border or borderless setting that are set as a current print setting may be displayed. In the case of the latter, the print preview can displayed closer to a print result.

If the number of prints setting button 603 is tapped, the user can set the number of prints. In a lower part of the screen illustrated in FIG. 6, "Total Number of Prints: 1" is displayed. In this manner, the currently-set number of prints is displayed. The user can select a plurality of print target images on the screen illustrated in FIG. 5. Then, the number of prints set by the number of prints setting button 603 is reflected on the plurality of print target images. In the lower part of the screen illustrated in FIG. 6, the total number of prints of the plurality of print target images is displayed. On a print setting screen to be described below, the same number of prints can be uniformly set for the plurality of print target images or the number of prints can be individually set for each of the plurality of print target images.

In the registered printer information 605, a name of a registered printer and an internet protocol (IP) address on a LAN of the printer are displayed. In a case where a plurality of printers is registered, if the user taps the registered printer information 605, a list of pieces of registered printer information 605 corresponding to the plurality of printers is displayed. Then, if the user taps the registered printer information 605 corresponding to a desired printer in the list, the printer corresponding to the tapped registered printer information 605 is selected as a printer to be used for printing. Then, the above-described list is hidden, and the screen illustrated in FIG. 6 is displayed again. At this time, the information tapped in the list is displayed as the registered printer information 605.

If the print setting button 606 is tapped, the print setting screen for changing a print setting is displayed. Details of the print setting screen will be described below. In the print setting display portion 607, a currently-set print setting is displayed. If the print setting is changed on the print setting screen and the screen illustrated in FIG. 6 is displayed again, the changed print setting is displayed in the print setting display portion 607. The print setting displayed in the print setting display portion 607 is stored in the program memory 213 or the nonvolatile memory 221, and if the printing application ends and is reactivated, the print setting is displayed in the print setting display portion 607 again. When the print setting confirmation screen illustrated in FIG. 6 is displayed for the first time after the printing application is installed on the terminal apparatus 200, a default print setting defined by the printing application is displayed in the print setting display portion 607.

FIG. 8 is a diagram illustrating the print setting screen to be displayed when the print setting button 606 illustrated in FIG. 6 is tapped. The print setting screen illustrated in FIG. 8 includes a return button 800 and a print setting button 801. The print setting button 801 includes items of "Setting of Number of Prints", "Printing of Date", "Automatic Image Correction", "Red-Eye Correction", "Sheet Size", "Type of Sheet", "Feeding Method", "Printing Quality", And "Border Setting". If the print setting button 801 is tapped, a list of options of print settings is displayed. By the user determining a desired option, a print setting is performed. If the "Setting of Number of Prints" is tapped, the user can select whether to collectively set the same number of prints for a plurality of print target images, or individually set the number of prints for each of a plurality of print target images. After the selection, the user can actually set the number of prints collectively for the plurality of print target images or individually for each of the plurality of print target images.

Figure 7:
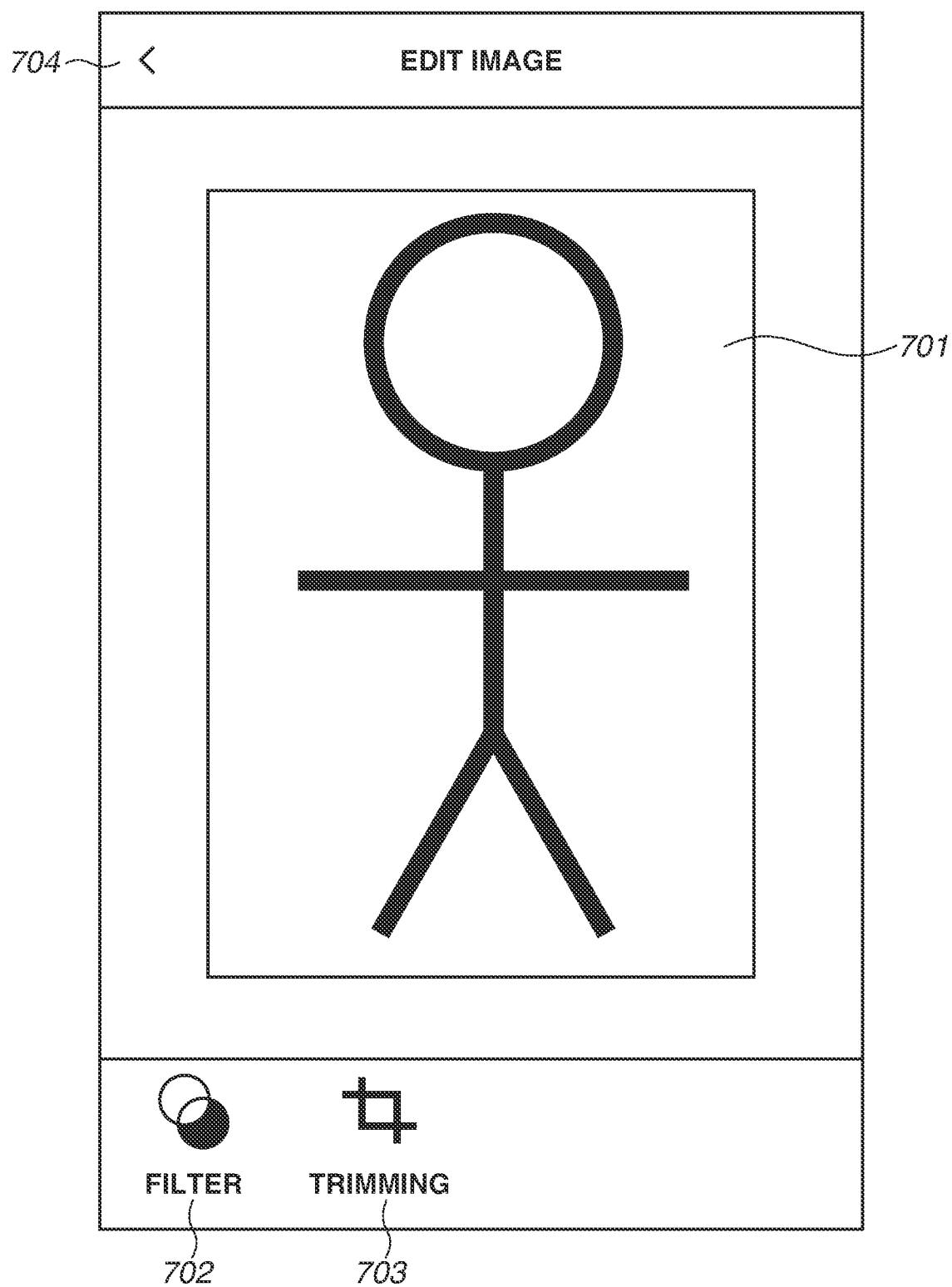
FIG. 7 is a diagram illustrating a workpiece edit screen.

FIG. 7 is a diagram illustrating a workpiece edit screen to be displayed when the workpiece edit button 604 is tapped. On the workpiece edit screen illustrated in FIG. 7, a return button 704, an edit result display portion 701, a filter instruction button 702, and a trimming instruction button 703 are displayed. If the return button 704 is tapped, the touch panel display 204 displays a screen displayed before the screen illustrated in FIG. 7. If the filter instruction button 702 is tapped, a filter application screen (not illustrated) is displayed. On the filter application screen, the user can apply filter processing of monochrome or sepia to a workpiece to be printed (print target image). If the trimming instruction button 703 is tapped, a trimming instruction screen (not illustrated) is displayed. On the trimming instruction screen, the user can perform a trimming setting (e.g., a setting as to whether to perform trimming processing, a setting of a size and a position of a trimming region) of the workpiece to be printed (print target image). In the edit result display portion 701, an edited workpiece to be printed (print target image) is displayed. For example, if the filter processing is applied and/or the trimming setting is performed as described above, the print target image on which the filter processing and/or the trimming processing have/has been executed is displayed in the edit result display portion 701. Then, if the return button 704 is tapped, the image on which the filter processing and/or the trimming processing have/has been executed as described above becomes a print target image to be actually printed, and the screen illustrated in FIG. 6 is displayed again. If the printing start button 601 illustrated in FIG. 6 is tapped in this state, the image on which the filter processing and/or the trimming processing have/has been executed by the printing application, is transmitted to the printing apparatus 300, and printing is executed.

Figure 9:
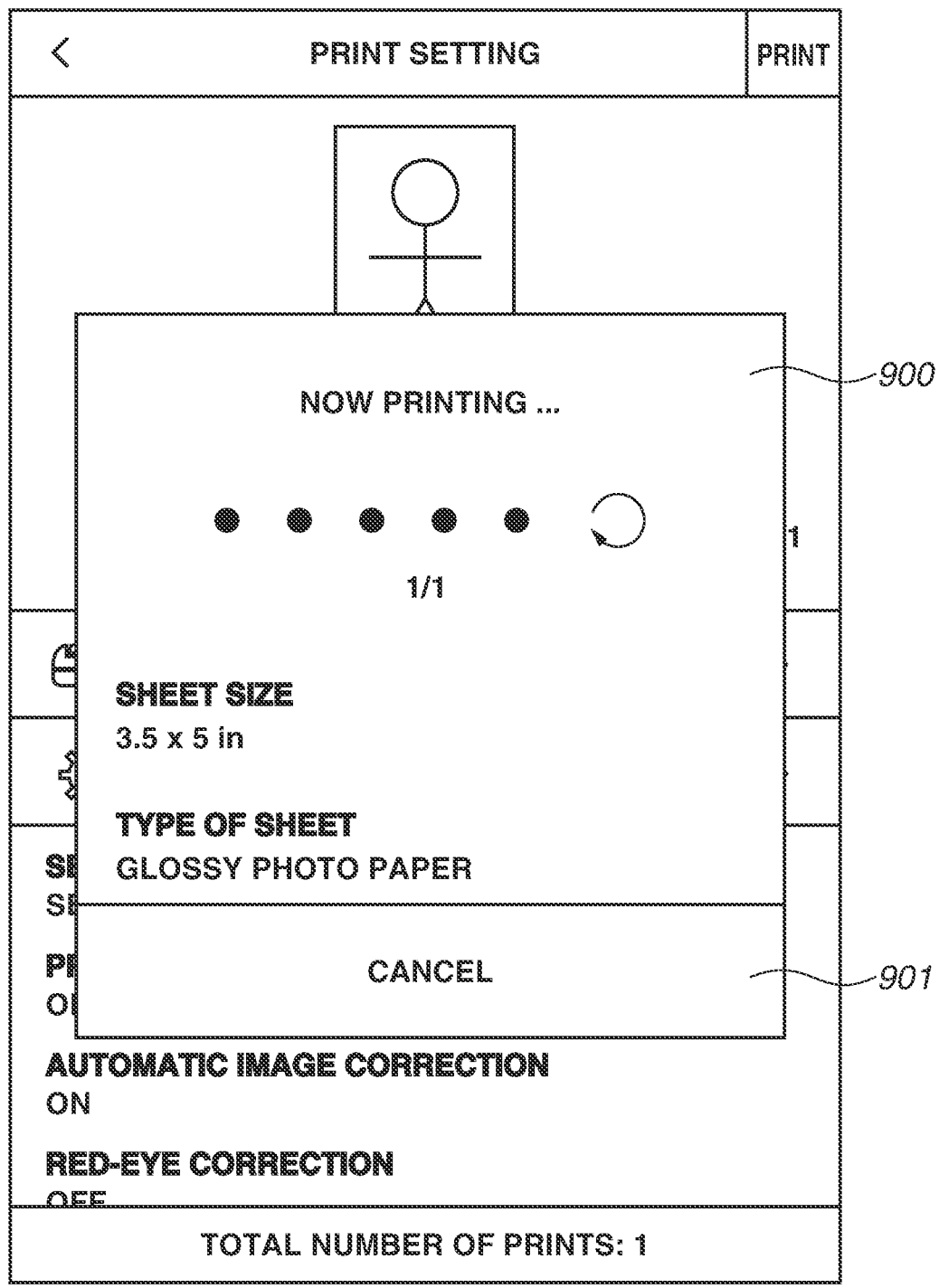
FIG. 9 is a diagram illustrating a print process in progress screen.

FIG. 9 is a diagram illustrating a print process in progress screen. If the printing start button 601 included in the print setting confirmation screen is tapped, a printing state display dialog 900 is displayed at the center of the screen. On the printing state display dialog 900, a message indicating a printing state such as "Now Printing", a total number of prints, a number of printed sheets, a print setting (e.g., sheet size, type of sheet), and a cancel button 901 are displayed. If the cancel button 901 is tapped, printing is cancelled. If the printing ends, the printing state display dialog 900 is hidden, and the print setting confirmation screen as illustrated in FIG. 6 is displayed again.

Figure 10:
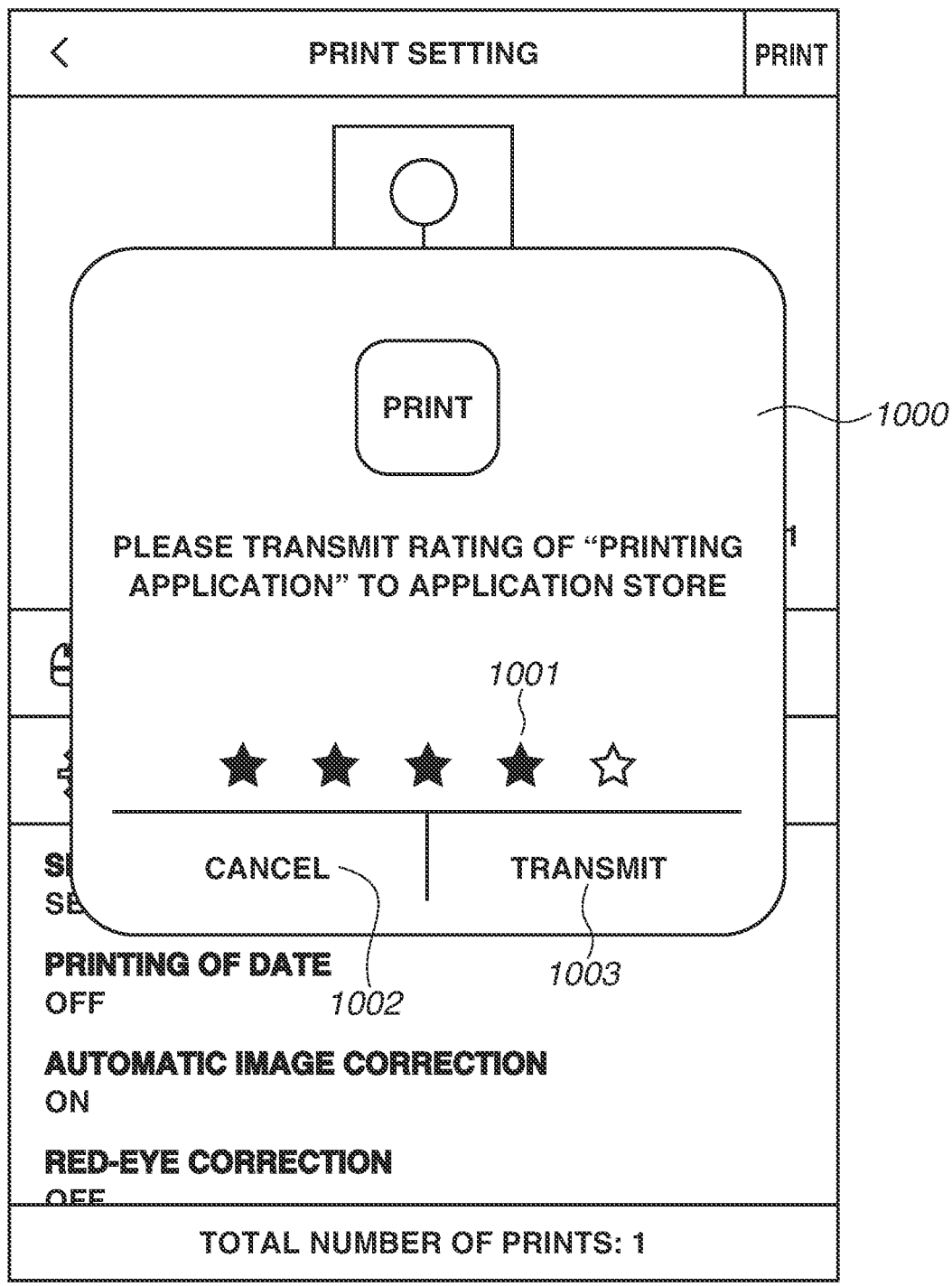
FIG. 10 is a diagram illustrating a rating information input screen.

FIG. 10 is a diagram illustrating a rating information input screen. As described below, if the printing has been completed, in place of the print process in progress screen illustrated in FIG. 9, the screen illustrated in FIG. 10 is displayed. The rating information input screen illustrated in FIG. 10 includes a rating information input dialog 1000, a rating information input unit 1001, a cancel button 1002, and a transmission button 1003. Using the rating information input unit 1001, the user can input a rating of the application based on the number of stars. More specifically, the user can input one to five stars as the rating. As the number of stars increases, the rating is higher. If the transmission button 1003 is tapped, the rating of the application input using the rating information input unit 1001 is transmitted to the application management server 103 by the processing performed by an OS. Then, the transmitted rating of the application is reflected in the rating of the printing application that is managed by the application management server 103. If the cancel button 1002 is tapped, the rating of the application input using the rating information input unit 1001 is discarded. Then, the rating information input dialog 1000 is hidden, and the print setting confirmation screen illustrated in FIG. 6 is displayed again. The rating information input screen illustrated in FIG. 10 is displayed in response to a display instruction issued to an OS via an application program interface (API) provided by the OS in the processing performed by the printing application. Then, rating information is transmitted in the processing performed by the OS. However, a display method and a transmission method are not limited to such configurations. The rating information input screen may be displayed using various methods and the rating information may be transmitted using various methods.

<Processing Flow>

Figure 11:
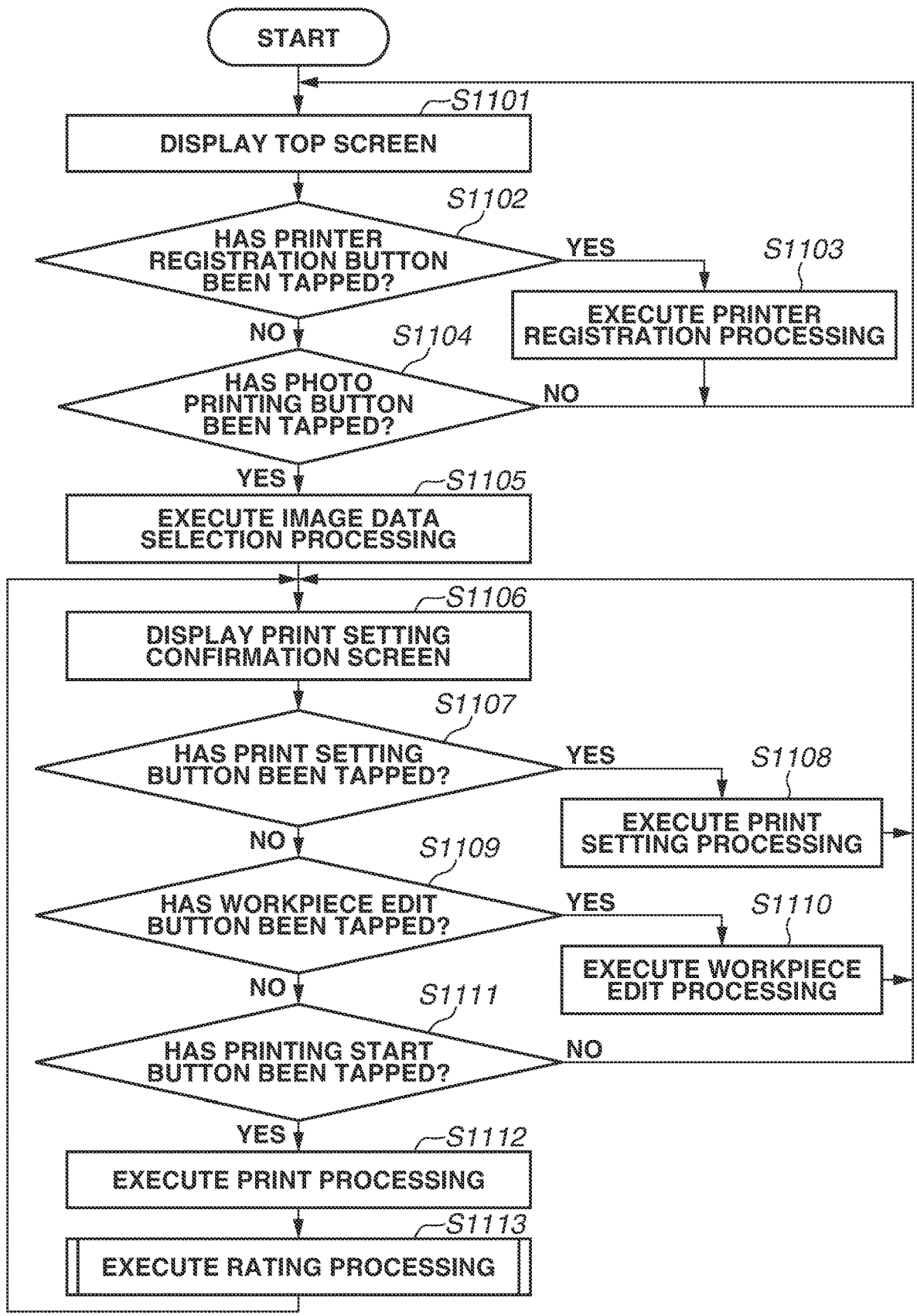
FIG. 11 is a flowchart illustrating print processing and rating processing according to the present exemplary embodiment.

Next, a processing flow according to the present exemplary embodiment will be described. Flowcharts illustrated in FIGS. 11 and 12 are implemented by the CPU 211 loading programs of the printing application that are stored in the program memory 213 or the nonvolatile memory 221 into the data memory 214 serving as a RAM, and executing the programs. Not all processing illustrated in FIGS. 11 and 12 is necessarily executed sequentially in one process. For example, a case may be possible in which an actor of the processing shifts to an OS once, the printing application is called by the OS again, and the subsequent processing is executed by the printing application.

FIG. 11 is a diagram illustrating print processing and rating processing according to the present exemplary embodiment. With reference to FIG. 11, an example case is described where printing is performed by the user tapping the button indicating "Photo" as the category selection button 408 on the top screen illustrated in FIG. 4. The processing in the flowchart illustrated in FIG. 11 is started when the CPU 211 activates the printing application. Then, while it is not illustrated in FIG. 11, the processing illustrated in FIG. 11 ends when the printing application ends.

If the printing application is activated, in step S1101, the CPU 211 displays the top screen of the printing application illustrated in FIG. 4. In step S1102, the CPU 211 determines whether the printer registration button 400 has been tapped on the top screen. If it is determined that the printer registration button 400 has been tapped (YES in step S1102), the processing proceeds to step S1103. In step S1103, the CPU 211 displays a printer registration screen (not illustrated).

In step S1103, the CPU 21 searches for a printing apparatus connected to a network to which the terminal apparatus 200 is connected, and displays a list of retrieved printing apparatuses on the touch panel display 204. Then, if one printer (e.g., the printing apparatus 300) is selected from among the plurality of printing apparatuses in the displayed list by a user input, the CPU 211 starts registration processing. More specifically, the CPU 211 communicates with the printing apparatus 300, acquires capability information regarding a print setting of the printing apparatus 300, and stores the capability information in the data memory 214. The capability information includes a model name of the apparatus, attribute information, and a settable print setting. If the registration processing is performed as described above in step S1003, the processing returns to step S1101. In step S1101, the CPU 211 displays the top screen on the touch panel display 204 again.

If it is determined that the printer registration button 400 has not been tapped (NO in step S1102), the processing proceeds to step S1104. In step S1104, the CPU 211 determines whether the category selection button 408 (in this example, the button "Photo") has been tapped on the top screen. If it is determined that the button "Photo" has been tapped as the category selection button 408 (YES in step S1104), the processing proceeds to step S1105. In step S1105, the CPU 211 displays the image data selection screen illustrated in FIG. 5. Based on a user operation performed on the image data selection screen, the CPU 211 selects print target image data. The display of the image data selection screen and the selection of image data in step S1105 may be executed as processing performed by the printing application, or may be executed as processing performed by another application. For example, if the printing application issues an image selection instruction to an OS via an API, a predetermined application that manages photos may be activated by the OS, and the image data selection screen may be displayed by the predetermined application. Then, if the user selects an image on the image data selection screen, the selected image data or a file path of the selected image data may be passed to the printing application by the OS.

In step S1106, the CPU 211 displays the print setting confirmation screen illustrated in FIG. 6. In step S1107, the CPU 211 determines whether the print setting button 801 has been tapped on the print setting confirmation screen. If it is determined that the print setting button 801 has been tapped (YES in step S1107), the processing proceeds to step S1108. In step S1108, the CPU 211 displays the print setting screen illustrated in FIG. 8. Based on a user operation performed on the print setting screen, the CPU 211 sets a print setting desired by the user. If it is determined that the print setting button 801 has not been tapped (NO in step S1107), the processing proceeds to step S1109. In step S1109, the CPU 211 subsequently determines whether the workpiece edit button 604 has been tapped. If it is determined that the workpiece edit button 604 has been tapped (YES in step S1109), the processing proceeds to step S1110. In step S1110, the CPU 211 displays the workpiece edit screen illustrated in FIG. 7. Based on a user operation performed on the workpiece edit screen, the CPU 211 performs workpiece edit processing desired by the user, such as filter processing or trimming processing, on the image data selected in step S1105. The image data selected in step S1105 is stored in a predetermined storage region in the image memory 220 that is allocated to the printing application by the OS. Then, the above-described filter processing or trimming processing is executed on image data stored in the predetermined storage region.

If it is determined that the workpiece edit button 604 has not been tapped (NO in step S1109), the processing proceeds to step S1111. In step S1111, the CPU 211 subsequently determines whether the printing start button 601 has been tapped. If it is determined that the printing start button 601 has not been tapped (NO in step S11), the processing returns to step S1106. In step S1106, the CPU 211 displays the print setting confirmation screen again. If it is determined that the printing start button 601 has been tapped (YES in step S1111), the processing proceeds to step S1112. In step S1112, the CPU 211 executes print processing on the image data that has been selected in step S1105 and is stored in the above-described predetermined storage region. More specifically, in step S1112, the CPU 211 executes rendering on the image data stored in the above-described predetermined storage region, and converts the image data into JPEG data printable by a printer. Furthermore, the CPU 211 generates printing data by adding a printing control command including print setting information set in step S1108 to the JPEG data. Then, the CPU 211 transmits the generated printing data to the printing apparatus 300 using the wireless LAN unit 202 via a wireless LAN. More specifically, the CPU 211 performs processing of instructing the OS to transmit the printing data as transmission processing performed by the printing application. Then, the CPU 211 controls the wireless LAN unit 202 through execution of the OS, and the printing data is transmitted to the printing apparatus 300 under the control. If the processing in step S1110 is executed, in step S1112, the image data on which the filter processing or the trimming processing has been executed is converted into JPEG data and transmitted to the printing apparatus 300.

If the print processing is executed in step S1112, in step S1113, the CPU 211 executes rating processing for prompting the user to rate the printing application. Details of the rating processing in step S1113 will be described below with reference to FIG. 12.

The case where the button "Photo" is touched as the category selection button 408 has been described with reference to FIG. 11. However, a button to be touched is not limited to the button "Photo", and any of the category selection buttons 408 illustrated in FIG. 4 can be selected. In such a case, the determination described in step S1104 is executed for all the category selection buttons 408. Then, if any of the category selection buttons 408 is selected, print processing corresponding to the selected category selection button 408 is executed as the processing in steps S1105 to S1112 of FIG. 11. After that, the processing described in step S1113 is executed.

FIG. 12 is a diagram illustrating the details of the rating processing in step S1113 of FIG. 11.

In step S1201, the CPU 211 determines whether printing in step S1112 has succeeded.

The method of determining whether the printing has succeeded varies depending on the model of the printing apparatus 300 to be used for the printing that is indicated by the registered printer information 605 on the print setting confirmation screen illustrated in FIG. 6. For example, for the printing apparatus 300 that mainly performs printing on an A4-size print sheet, the CPU 211 performs periodical check processing by executing the printing application. The periodical check processing refers to processing of periodically checking a printing status of the printing apparatus 300 by the CPU 211 performing bidirectional communication with the printing apparatus 300 via a wireless LAN after transmitting the printing data to the printing apparatus 300. Then, the CPU 211 determines that the printing has succeeded by the printing application receiving, from the printing apparatus 300, information indicating that the printing has been completed in the printing apparatus 300.

In a large-size printing apparatus 300 that mainly performs printing on a large print sheet such as an A0-size sheet, a longer printing time is often required as compared with the above-described printing apparatus 300 that mainly performs printing on an A4-size print sheet. Thus, the printing application may be designed not to perform the above-described periodical check processing for the large-size printing apparatus 300. If the printing application performs the periodical check processing in the large-size printing apparatus 300, the printing application operates in the foreground for a long time in the terminal apparatus 200. For the portable terminal apparatus 200 according to the present exemplary embodiment, it is sometimes undesirable from an aspect of usability that a specific application operates in the foreground for a long time. Thus, in the present exemplary embodiment, the printing application does not perform the periodical check processing in a printing apparatus of a specific model such as a large-size printing apparatus 300. As for such a large-size printing apparatus 300, in step S1201, it is determined that printing has succeeded if printing data transmission to the printing apparatus 300 has been completed.

In step S1201, if it is determined that the printing has failed (NO in step S1201), the processing proceeds to step S1202. In step S1202, the CPU 211 displays a printing error screen on the touch panel display 204. For example, in place of the printing state display dialog 900 on the print process in progress screen illustrated in FIG. 9, a dialog (not illustrated) indicating that a printing error has occurred is displayed.

In step S1201, if it is determined that the printing has succeeded (YES in step S1201), the processing proceeds to step S1203. As described below, if it is determined to be YES in all the determinations in steps S1203, S1204, S1205, and S1207 in addition to the determination in step S1201, processing in step S1208 is executed. In step S1208, display control for displaying an input screen for inputting rating information is executed. In other words, obtaining determination results in steps S1201, S1203, S1204, S1205, and S1207 serve as a condition for asking the user to rate the printing application.

The processing performed in step S1203 and subsequent steps may be executed every time it is determined to be YES in step S1201, or needs not be executed in some cases even if it is determined to be YES in step S1201. In other words, there may be cases where the input screen for inputting the rating information is not displayed irrespective of determination results obtained in steps S1201, S1203, S1204, S1205, and step S1207. For example, the processing in step S1202 may be executed for the first time if the number of times it is determined to be YES in step S1201 exceeds a predetermined number of times. Alternatively, the processing in step S1203 and subsequent steps needs not be executed even if it is determined to be YES in step S1201 once the processing in step S1208, which will be described below, is executed. In a case where the processing in step S1203 and subsequent steps is not executed even if it is determined to be YES in step S1201 as described above, the processing illustrated in FIG. 12 ends after step S1201. If it is determined to be NO in step S1201, the processing in step S1202 is always executed.

Next, in step S1203, the CPU 211 determines whether the printing apparatus 300 having been instructed to execute the print processing in step S1112 is a target model of the above-described periodical check processing. The determination in step S1203 is performed based on attribute information stored in the data memory 214 at the time of printer registration. For example, the attribute information includes information indicating whether the apparatus is the target model of the periodical check processing, and the information is referred to in step S1203. Moreover, the determination in step S1203 may be performed by checking a model name stored in the data memory 214 at the time of printer registration (model name indicated by the registered printer information 605) against a list of target models of the periodical check processing that has been held by the application in advance. The list is stored in the data memory 214 or the program memory 213 at the time of installation of the printing application on the program memory 213, for example.

In step S1203, if the CPU 211 determines that the printing apparatus 300 is not the target model of the periodical check processing (NO in step S1203), the processing illustrated in FIG. 12 ends. On the other hand, in step S1203, if it is determined that the printing apparatus 300 is the target model of the periodical check processing (YES in step S1203), the processing proceeds to step S1204.

Next, in step S1204, the CPU 211 determines whether the printing application used in the execution of the processing illustrated in FIGS. 11 and 12 is an application to be rated. The printing application according to the present exemplary embodiment is created for a plurality of different OSs. For example, a printing application for an OS (a) will be referred to as a printing application (a), and a printing application for an OS (b) will be referred to as a printing application (b). While the printing application (a) is an application to be rated, the printing application (b) is not an application to be rated. In addition, the processing illustrated in FIGS. 11 and 12 is executed by both the printing application (a) and the printing application (b). In this case, in step S1204, for example, it is determined whether the printing application operates in the OS (a) serving as a predetermined OS. If it is determined that the printing application operates in the OS (a) serving as the predetermined OS, the printing application is the printing application (a) and is determined to be the application to be rated (YES in step S1204), and the processing proceeds to step S1205. If it is determined that the printing application operates in an OS (e.g., OS (b)) different from the OS (a) serving as the predetermined OS, the printing application is determined not to be the application to be rated (NO in step S1204), and the processing illustrated in FIG. 12 ends.

For example, the printing application (b) may be originally created not to execute the processing in step S1204 and subsequent steps of FIG. 12. Nevertheless, as described above, the printing application according to the present exemplary embodiment is created in a cross-platform programming language such as HTML5 or JavaScript. Thus, the printing application can be created more easily by achieving commonality of the processing illustrated in FIG. 12 between the printing application (a) and the printing application (b).

Next, in step S1205, the CPU 211 determines whether the rating information has already been transmitted in the current version of the application. More specifically, the determination in step S1205 is executed based on a transmission flag indicating whether the rating information has been transmitted that is stored in the data memory 214. The flag is updated in the processing in step S1210, which will be described below. In step S1205, if it is determined that the rating information has been transmitted (YES in step S1205), the processing illustrated in FIG. 12 ends. In step S1205, if it is determined that the rating information has not been transmitted (NO in step S1205), the processing in step S1206 is executed.

Next, in step S1206, the CPU 211 communicates with the application control information management server 104, acquires control information about the printing application, and stores the control information in the data memory 214. Next, in step S1207, the CPU 211 determines whether to display a dialog for inputting the rating information by referring to the control information about the printing application that has been stored in the data memory 214 in step S1206. In step S1207, if it is determined that the dialog is not to be displayed (NO in step S1207), the processing illustrated in FIG. 12 ends.

In step S1207, if it is determined that the dialog is to be displayed (YES in step S1207), the processing proceeds to step S1208. In step S1208, the CPU 211 performs display control for displaying the dialog for inputting the rating information. By the processing in step S1208, the rating information input dialog 1000 is displayed on the touch panel display 204 as illustrated in FIG. 10. If the rating information is input by the user on the rating information input dialog 1000 and the transmission button 1003 is tapped, the rating information is transmitted to the application management server 103.

The display of the rating information input dialog 1000 and the transmission of the rating information may be executed under control of the printing application or may be executed by an OS irrespective of the printing application. In the case of the former, in step S1208, it is determined whether the transmission button 1003 has been tapped by the user, and the rating information is transmitted if the transmission button 1003 is tapped. Even in the case of the latter where the rating information input dialog 1000 is displayed by the OS, in step S1208, the OS is instructed to display the input screen for inputting the rating information as display control performed by the printing application. The rating information is transmitted to the application management server 103 via a wireless LAN or the Internet. The rating information transmitted in this manner is reflected in the rating of the printing application.

Next, in step S1209, the CPU 211 determines whether the rating information has been transmitted. For example, if the rating information is transmitted under the control of the OS irrespective of the printing application, in step S1209, it is determined whether information indicating that the rating information has been transmitted has been input to the printing application. Alternatively, if the rating information is transmitted under the control of the printing application, in step S1209, it is determined whether the rating information has been transmitted in step S1208.

In step S1209, if it is determined that the rating information has not been transmitted (NO in step S1209), the CPU 211 ends the processing illustrated in FIG. 12. In step S1209, if it is determined that the rating information has been transmitted (YES in step S1209), the processing proceeds to step S1210. In step S1210, the CPU 211 updates the transmission flag of the rating information stored in the data memory 214 to a transmitted state. The updated transmission flag is referred to when the processing in step S1205 is executed again. Thus, in a case where image data of an image selected by the user is transmitted from the terminal apparatus 200 to the same or different printing apparatus 300 again and it is determined again, in step S1201, that the printing has been completed, the input screen for inputting the rating information is not displayed again. Accordingly, it is possible to prevent the user from being asked to give rating again although the user has already given the rating.

As described above, in the processing illustrated in FIG. 12, display for inputting rating is performed based on printing of image data selected by the user having been completed by the printing application. This can prevent the user from being asked to give a rating although the printing has not been completed yet, and the user can appropriately give a rating of the printing application in a state in which the printing of the data selected by the user has been completed.

Furthermore, as described above, the printing application according to the present exemplary embodiment executes the periodical check processing of checking whether the printing has been completed by continuously communicating with the printing apparatus 300 after print target image data is transmitted to the printing apparatus 300. In addition, the printing application supports, as the printing apparatus 300, both the model on which the periodical check processing is performed and a model on which the periodical check processing is not performed. In the present exemplary embodiment, the input screen for inputting the rating information is displayed on the model on which the periodical check processing is performed on condition that completion of printing is confirmed (YES in both of steps S1201 and S1203). Thus, the user can be prompted to input the rating information after it is surely confirmed that the printing has been completed.

In the flow illustrated in FIG. 12, the determination processing (step S1203) as to whether the printing apparatus is the target model of the periodical check processing may be executed before the determination processing (step S1201) as to whether the printing has succeeded. However, by performing the processing in the order illustrated in FIG. 12, the printing error screen in step S1202 can also be displayed on the model on which the periodical check processing is not performed. In addition, the acquisition processing (step S1206) of the control information about the printing application may be executed immediately after the printing application is activated.

As described above, in the flow illustrated in FIG. 12, the printing application can perform input processing of the rating information and transmission processing of the rating information using an API of an OS. In this case, if the printing application can identify whether the rating information has been transmitted, the processing illustrated in FIG. 12 is performed. If the printing application cannot identify whether the OS has transmitted the rating information, the processing in steps S1205, S1209, and S1210 needs not be executed. More specifically, the determination (step S1205) as to whether the rating information has already been transmitted, the determination (step S1209) as to whether the rating information has been transmitted, and the update processing (step S1210) of the transmission flag are not performed. Whether the printing application can identify whether the OS has transmitted the rating information depends on specifications of the OS.

In the above-described exemplary embodiment, the printing application that causes the printing apparatus to perform printing has been described as an example of the application. However, the application is not limited to the printing apparatus. For example, an application that causes an external display device to display data to be displayed may be used. In other words, the processing according to the present exemplary embodiment can be applied to an application that causes an external device to execute various types of processing. In such a case, the CPU 211 causes the external device to execute predetermined processing using the application, and an input screen for inputting a rating of the application is displayed on condition that the predetermined processing has been completed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-110637, filed Jun. 13, 2019, which is hereby incorporated by reference herein in its entirety.

What is claimed is:

1. An information processing method, to be executed by an information processing apparatus, that supports a printing apparatus in performing printing using at least one processor to execute a program, the information processing method comprising:

causing a user to select a printing apparatus to print an image;

executing processing in which the information processing apparatus transmits data corresponding to the image to the printing apparatus selected by the user;

performing, by the program, a display process for displaying, on a display used by the information processing apparatus, an input screen for the user to input a rating of the program based on the data being transmitted to the printing apparatus; and determining whether the printing apparatus is a specific model or not, wherein in a case where it is determined that the printing apparatus is the specific model, the input screen is displayed in response to receipt of a notification that printing has been completed from the printing apparatus, and wherein in a case where it is determined that the printing apparatus is not the specific model, the input screen is displayed in response to transmission of the data to the printing apparatus, wherein a printing apparatus that is not the specific model is capable of printing an image on a print medium of a larger size than that of a printing apparatus that is the specific model.

2. The information processing method according to claim 1,
wherein a predetermined error screen is displayed on the display in a case where the printing of the data is determined as not having been completed for any of the printing apparatus that is the specific model and the printing apparatus that is not the specific model.

3. The information processing method according to claim 1, wherein, in a case where a rating is input by the user on the displayed input screen and the information processing apparatus transmits the input rating to a predetermined server based on an instruction issued by the user, the input screen is not displayed on the display again even if data is transmitted again.

4. The information processing method according to claim 1, wherein the program is a printing application operating under control of an operating system (OS).

5. The information processing method according to claim 4, wherein the input screen is displayed on the display on a further condition that the printing application operates under control of a predetermined OS.

6. The information processing method according to claim 1,
wherein the at least one processor further executes receiving of predetermined information for determining whether to display the input screen from a server, and
wherein the input screen is displayed on the display on a further condition that the received predetermined information indicates that the input screen is to be displayed.

7. The information processing method according to claim 1, wherein the at least one processor further executes selecting a print target image from among a plurality of images based on an instruction issued by a user, and wherein a plurality of thumbnails corresponding to a plurality of images stored in the information processing apparatus is displayed on the display in list form, and an image corresponding to a thumbnail selected from among the plurality of thumbnails based on an instruction from the user issued on the display is selected as the print target image.

8. An information processing apparatus comprising:
at least a processor and at least a memory coupled to at least the processor and having stored thereon instructions, when executed by at least the processor, and cooperating to act as:
a reception unit configured to receive a printing apparatus selected by a user to print an image;
a transmission unit configured to execute processing in which the information processing apparatus transmits data corresponding to the image to the printing apparatus received by the reception unit;
a determination unit configured to determine whether printing performed by the printing apparatus based on the data transmitted by the information processing apparatus in the processing executed by the transmission unit having been completed;
a display control unit configured to display, on a display included in the information processing apparatus, an input screen for the user to input a rating of a predetermined program based on the data being transmitted to the printing apparatus;
and determining whether the printing apparatus is a first model or a second model,
wherein in a case where the printing apparatus is a specific model, the input screen is displayed in response to receipt of a notification that printing has been completed from the printing apparatus, and
wherein in a case where the printing apparatus is not the specific model, the input screen is displayed in response to transmission of the data to the printing apparatus,
wherein the printing apparatus that is not the specific model is capable of printing an image on a print medium of a larger size that that of the specific model.

9. The information processing apparatus according to claim 8,
wherein a predetermined error screen is displayed on the display in a case where the determination unit determines that the printing of the data has not been completed for any of the printing apparatus that is the specific model and the printing apparatus that is not the specific model.

10. The information processing apparatus according to claim 8, wherein, in a case where a rating is input by the user on the input screen displayed by the display control unit and the information processing apparatus transmits the input rating to a predetermined server based on an instruction issued by the user, the display control unit does not display the input screen on the display again even if data is transmitted again by the transmission unit.

11. The information processing apparatus according to claim 8, wherein the predetermined program is a printing application operating under control of an operating system (OS).

12. The information processing apparatus according to claim 11, wherein the display control unit displays the input screen on the display on a further condition that the printing application operates under control of a predetermined OS.

13. The information processing apparatus according to claim 8, further comprising a receiving unit configured to receive predetermined information for determining whether to display the input screen from a server,
wherein the display control unit displays the input screen on the display on a further condition that the predetermined information received by the receiving unit indicates that the input screen is to be displayed.

14. The information processing apparatus according to claim 8, wherein the at least one processor further executes selecting a print target image from among a plurality of images based on an instruction issued by a user, and
wherein a plurality of thumbnails corresponding to a plurality of images stored in the information processing apparatus is displayed on the display in list form, and the selection unit selects, as the print target image, an image corresponding to a thumbnail selected from among the plurality of thumbnails based on an instruction from the user issued on the display.

15. A non-transitory storage medium storing a program for performing an information processing method, the information processing method using at least one processor that executes the program to support a printing apparatus in performing printing, the information processing method comprising:
causing a user to select a printing apparatus to print an image;
executing processing for transmitting data corresponding to the image to the printing apparatus selected by the user;
performing, by the program, a display process for displaying, on a display included in the information processing apparatus, an input screen for the user to input a rating of the program based on the data being transmitted to the printing apparatus; and determining whether the printing apparatus is a specific model or not, wherein in a case where it is determined that the printing apparatus is the specific model, the input screen is displayed in response to receipt of a notification that printing has been completed from the printing apparatus, and wherein in a case where it is determined that the printing apparatus is not the specific model, the input screen is displayed in response to transmission of the data to the printing apparatus, wherein a printing apparatus that is not the specific model is capable of printing an image on a print medium of a larger size than that of a printing apparatus that is the specific model.

* * * * *